United States Patent
Saito

(10) Patent No.: US 6,425,160 B1
(45) Date of Patent: *Jul. 30, 2002

(54) INTERMITTENT DRIVING APPARATUS FOR ROTARY WINDOW CLEANER

(75) Inventor: Shosaku Saito, Shizuoka (JP)

(73) Assignee: Saito Motors Co., Ltd., Shizuoka-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/417,923

(22) Filed: Oct. 13, 1999

(51) Int. Cl.[7] ................................................. B60S 1/44
(52) U.S. Cl. ............................... 15/250.22; 15/250.16; 15/250.17; 318/DIG. 2; 318/444
(58) Field of Search ........................ 15/250.22, 250.12, 15/250.17, 250.16, 250.27; 318/DIG. 2, 443, 444, 484

(56) References Cited

U.S. PATENT DOCUMENTS

| 3,649,990 A | | 3/1972 | Saito | | |
|---|---|---|---|---|---|
| 4,585,980 A | * | 4/1986 | Gille et al. | ............... | 15/250.17 |
| 4,701,972 A | | 10/1987 | Saito | | |
| 4,773,117 A | | 9/1988 | Saito | | |
| 5,210,900 A | | 5/1993 | Saito | | |
| 6,263,537 B1 | * | 7/2001 | Saito | ........................ | 15/250.22 |

* cited by examiner

Primary Examiner—Gary K. Graham
(74) Attorney, Agent, or Firm—Rodman & Rodman

(57) ABSTRACT

An intermittent driving apparatus for a rotary window cleaner comprises a first wiper (2) which is connected to a rotating shaft (10) of a first motor (8) and is rotatably disposed on a front window (1), a second wiper (3) which is connected to a rotating shaft (11) of a second motor (9) and is rotatably disposed on a front window (1) adjacently to the first wiper (2), and an electronic control circuit having brush boards (18, 20) of two motors connected to each other so that the second motor (9) is rotated at a predetermined time after the first motor (8) is rotated. The electronic control circuit includes a signal generating circuit (30) for repeatedly sending signals to the brush board (18) of the first motor (8) at fixed time intervals, and a brake mechanism for stopping the two wipers at the start position for a predetermined time every one rotation.

5 Claims, 6 Drawing Sheets

INTERMITTENT DRIVING APPARATUS FOR ROTARY WINDOW CLEANER

BACKGROUND OF THE INVENTION

Field of the Invention

The present invention relates to an intermittent driving apparatus for a rotary window cleaner used for an automobile and other vehicles, a railroad car, a ship, an airplane, and the like. More particularly, it relates to an intermittent driving apparatus for a rotary window cleaner in which a rotary wiper is driven intermittently while being stopped at a fixed position for a predetermined time every one rotation.

A rotary window cleaner is used to wipe rainwater put on a front window by rotating a wiper, and is known from U.S. Pat. Nos. 3649990, 4701972, 4773117, and 5210900. These well-known rotary window cleaners somewhat rotate because a motor has inertia even when a power source for the motor for rotating the wiper is turned off. Therefore, it is difficult for the known rotary window cleaner to always stop the wiper at a fixed position every one rotation, so that merely a low-speed operation and a high-speed operation are performed, and the known rotary window cleaner is not provided with an intermittent driving mechanism for performing an intermittent operation.

At the time of rainfall of a very small amount or a small amount, like a reciprocating window cleaner, the rotary window cleaner is required to be provided with an intermittent driving apparatus for performing an intermittent operation which less hinders the field of view on the front window.

SUMMARY OF THE INVENTION

An object of the present invention is to provide an intermittent driving apparatus for a rotary window cleaner in which a predetermined time after one of two rotating wipers disposed on a front window so as to be close to each other is started, the other is started, and the rotating wipers are intermittently driven while being stopped at the start position for a predetermined time every one rotation.

An intermittent driving apparatus for a rotary window cleaner in accordance with the present invention comprises a first wiper which is connected to a rotating shaft of a first motor and is rotatably disposed on a front window, a second wiper which is connected to a rotating shaft of a second motor and is rotatably disposed on the front window adjacently to the first wiper, and an electronic control circuit having brush boards of two motors connected to each other so that the second motor is rotated at a predetermined time after the first motor is rotated. The electronic control circuit includes a signal generating circuit for repeatedly sending signals to the brush board of the first motor at predetermined time intervals, and a brake mechanism for stopping the two wipers at the start position for a predetermined time every one rotation.

DETAILED DESCRIPTION OF THE PREFERRED EMBODIMENTS

Figure 1:
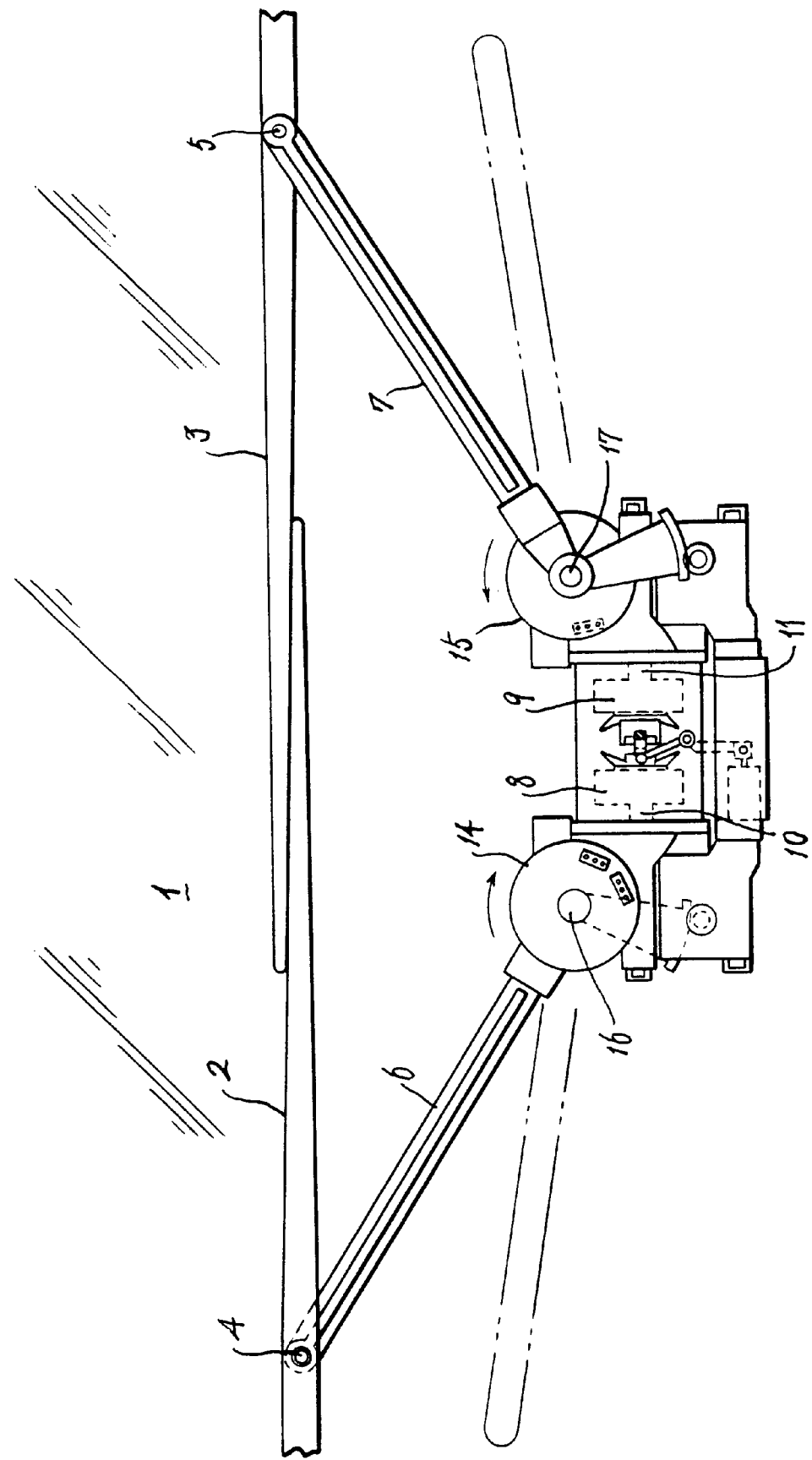
FIG. 1 is a back face view showing a state in which a rotary window cleaner having an intermittent driving apparatus in accordance with the present invention is attached to an automotive front window.
Figure 2:
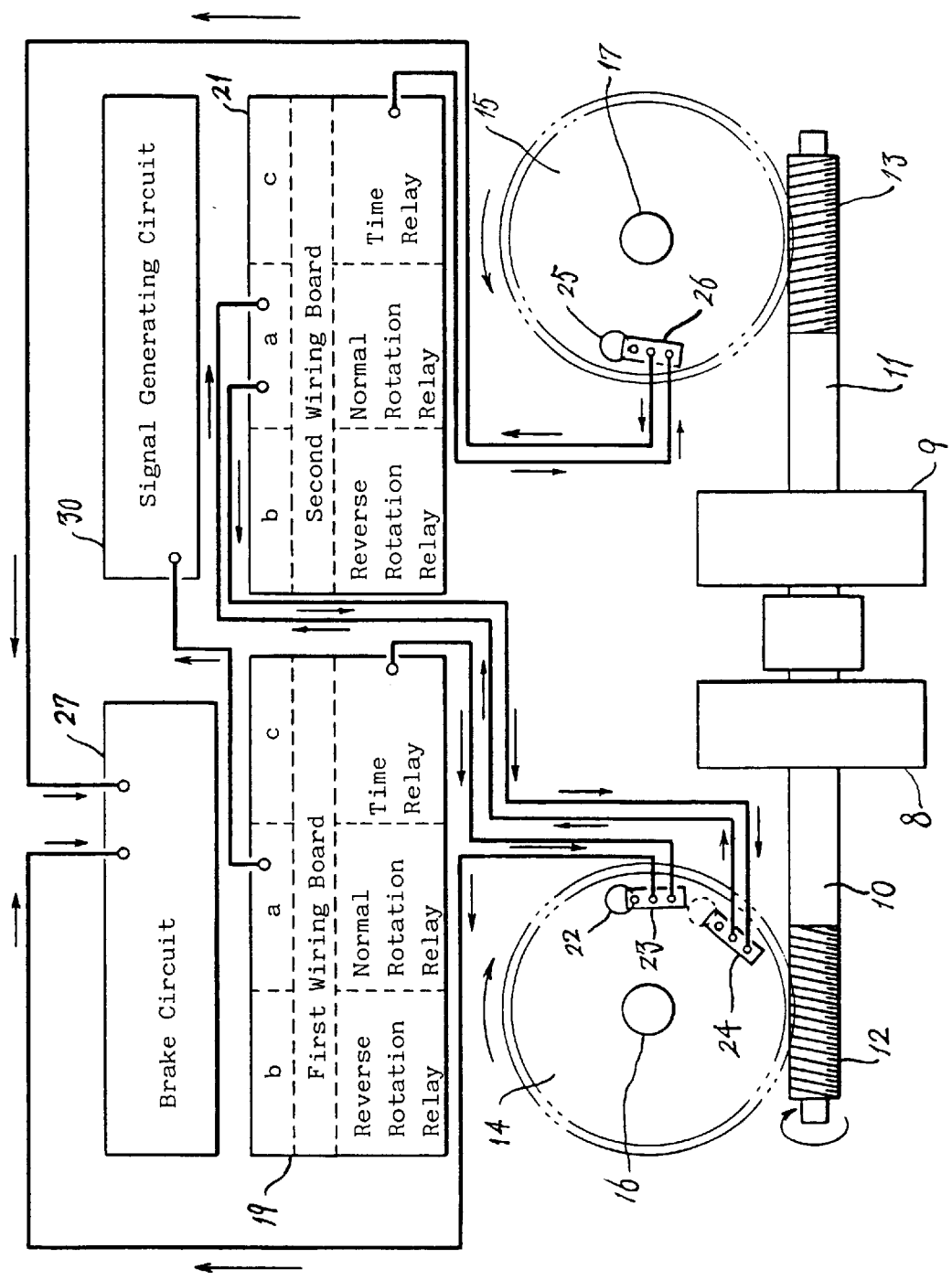
FIG. 2 is a block diagram of an electronic control circuit of an intermittent driving apparatus for a rotary window cleaner in accordance with the present invention.

FIG. 1 shows a state in which a rotary window cleaner having an intermittent driving apparatus in accordance with the present invention is attached to a front window 1. On the front window 1, there are disposed two wipers 2 and 3 so that they are close to each other. The wiper 2, 3 is supported by a support cylinder 6, 7 so as to be rotatable around a rotating shaft 4, 5, and the support cylinder 6, 7 is provided therein with a transmitting mechanism such as a toothed belt or a chain for transmitting the rotation of a motor 8, 9 to the rotating shaft 4, 5 of the wiper 2, 3. The support cylinder 6, 7 is pivotably supported on a support shaft 16, 17 of a motor gear 14, 15 engaging with a worm 12, 13 formed on a driving shaft 10, 11 (see FIG. 2) of the motor 8, 9. The rotation of the motor gear 14, 15 is transmitted to the rotating shaft 4, 5 of the rotating wiper 2, 3 through the transmitting mechanism which is engaged with the support shaft 16, 17 and the rotating shaft 4, 5 and which is provided in the support cylinder 6, 7, and the wiper 2, 3 is rotated by the rotating shaft 4, 5.

Figure 3:
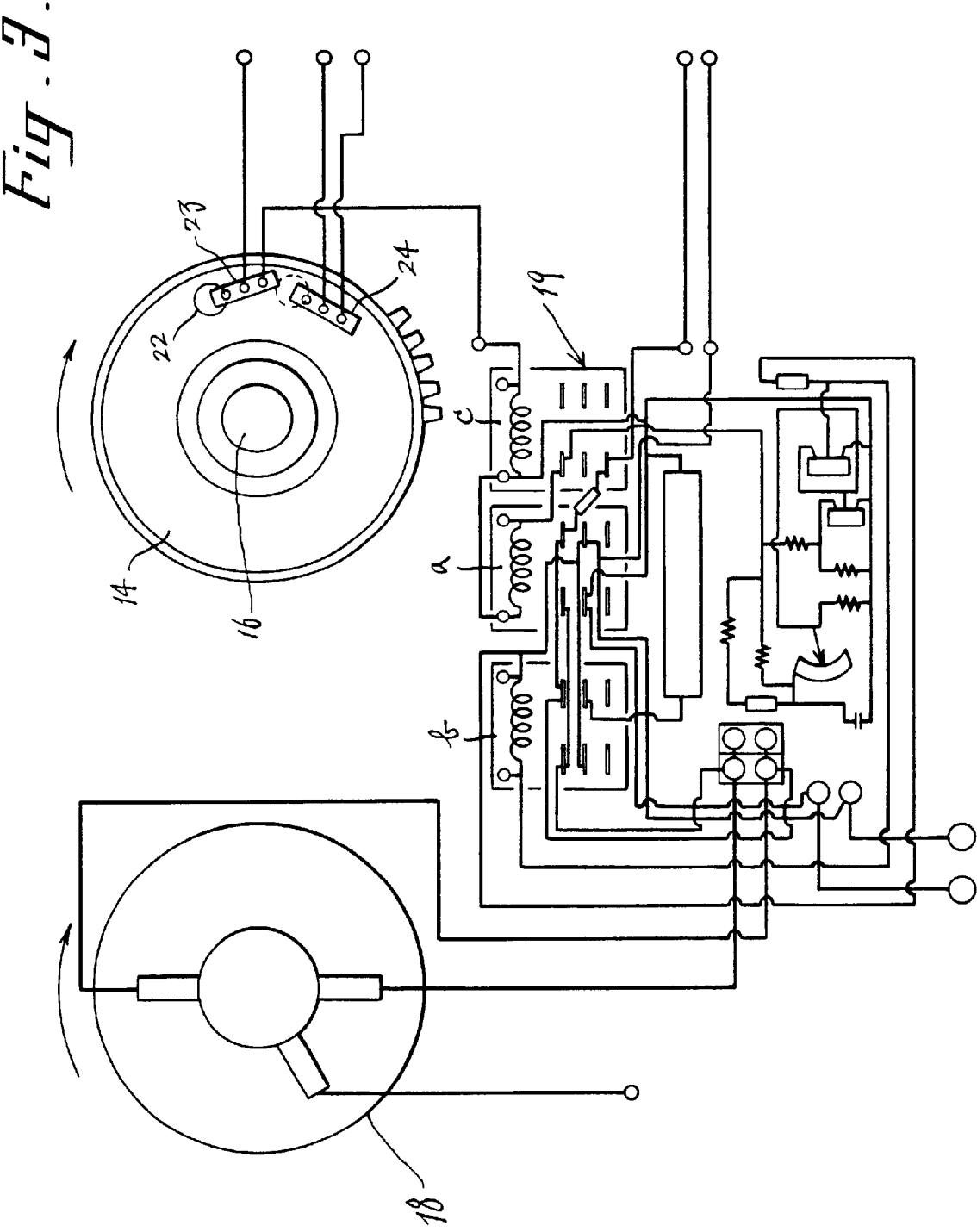
FIG. 3 is a circuit diagram of a start and brake mechanism of a first motor of an intermittent driving apparatus for a rotary window cleaner in accordance with the present invention.
Figure 4:
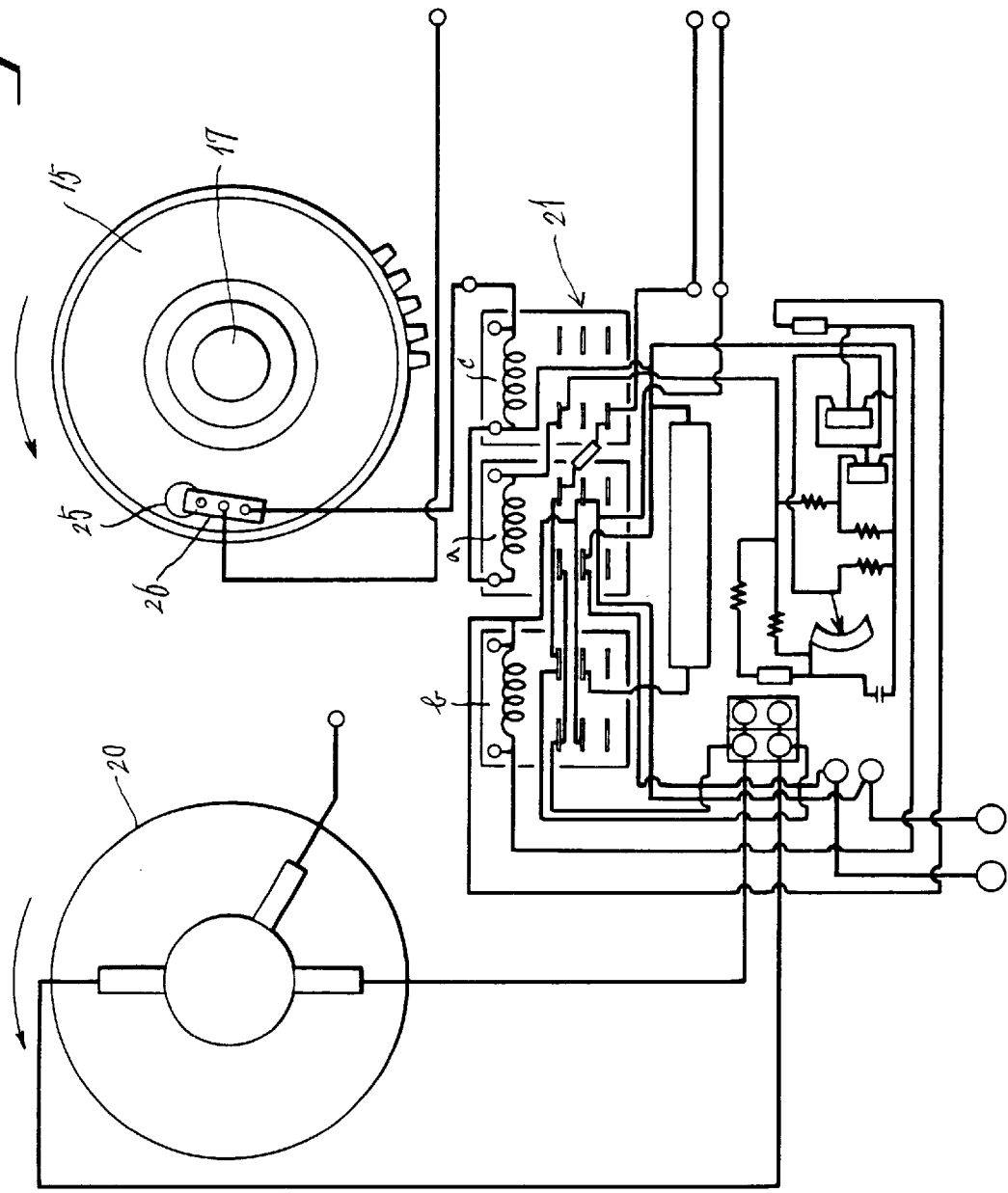
FIG. 4 is a circuit diagram of a start and brake mechanism of a second motor of an intermittent driving apparatus for a rotary window cleaner in accordance with the present invention.

A brush board 18 for the first motor 8 is connected to a first wiring board 19 as shown in FIG. 3, and a brush board 20 for the second motor 9 is connected to a second wiring board 21 as shown in FIG. 4. The brush board 18 of the first motor 8 and the brush board 20 of the second motor 9 are connected to each other through an electronic control circuit of the first wiring board 19 and the second wiring board 21 connected to each other. The first motor gear 14 for decreasing the rotational speed of the first motor 8 is provided with an operation cam 22, and the first wiring board 19 is connected to a first motor brake sensor 23, which are disposed in a gear box of the motor gear 14, so that the operation cam 22 is engaged with the first motor brake sensor 23 by the rotation of the motor gear 14. The motor gear 15 for decreasing the rotational speed of the second motor 9 is provided with an operation cam 25, and the second wiring board 21 is connected to a brake sensor 26, which is disposed in a gear box of the motor gear 15, so that the operation cam 25 is engaged with the brake sensor 26 by the rotation of the motor gear 15.

As shown in FIG. 3, the first wiring board 19 of the electronic control circuit is connected to the brush board 18 of the first motor 8 and the brake sensor 23 disposed in the gear box of the motor gear 14, and has a normal rotation relay (a), a reverse rotation relay (b), and a time relay (c). The normal rotation relay (a) of the first wiring board 19 is connected to a signal generating circuit 30 and the brush board 18 of the first motor 8 so as to send a signal generated from the signal generating circuit 30 to the brush board 18 and turn on the first motor 8 to rotate the wiper 2. The time relay (c) is connected to the brake sensor 23, the normal rotation relay (a), and the reverse rotation relay (b) so as to turn on the reverse rotation relay (b) and turn off the normal rotation relay (a) when the operation cam 22 is engaged with the brake sensor 23 by the rotation of the motor gear 14. The reverse rotation relay (b) is connected to the time relay (c) and the brush board 18 so as to send a brake signal from the time relay (c) to the brush board 18 to stop the first motor 8 at the start position.

A second motor start sensor 24, which is disposed in the gear box of the motor gear 14 of the first motor 8, is connected to the second wiring board 21 connected to the brush board 20 of the second motor 9. The operation cam 22 is also engaged with the second motor start sensor 24 as well as the first motor brake sensor 23 by the rotation of the motor gear 14.

As shown in FIG. 4, the second wiring board 21 of the electronic control circuit is connected to the brush board 20 of the second motor 9 and the brake sensor 26 disposed in the gear box of the motor gear 15, and has a normal rotation relay (a), a reverse rotation relay (b), and a time relay (c). The normal rotation relay (a) is connected to the second motor start sensor 24, which is disposed in the gear box of the motor gear 14 of the first motor 8, and the brush board 20 of the second motor 9 so as to send a start signal of the second motor start sensor 24 to the brush board 20 to rotate the second motor 9 at a predetermined time after the first motor 8 is rotated, that is, when the operation cam 22 is engaged with the second motor start sensor 24 by the rotation of the motor gear 14. The time relay (c) is connected to the brake sensor 26, the normal rotation relay (a), and the reverse rotation relay (b) so as to turn on the reverse rotation relay (b) and turn off the normal rotation relay (a) when the operation cam 15 is engaged with the brake sensor 26 by the rotation of the motor gear 15. The reverse rotation relay (b) is connected to the time relay (c) and the brush board 20 so as to send a brake signal from the time relay (c) to the brush board 20 to stop the second motor 9 at the start position.

Figure 5:
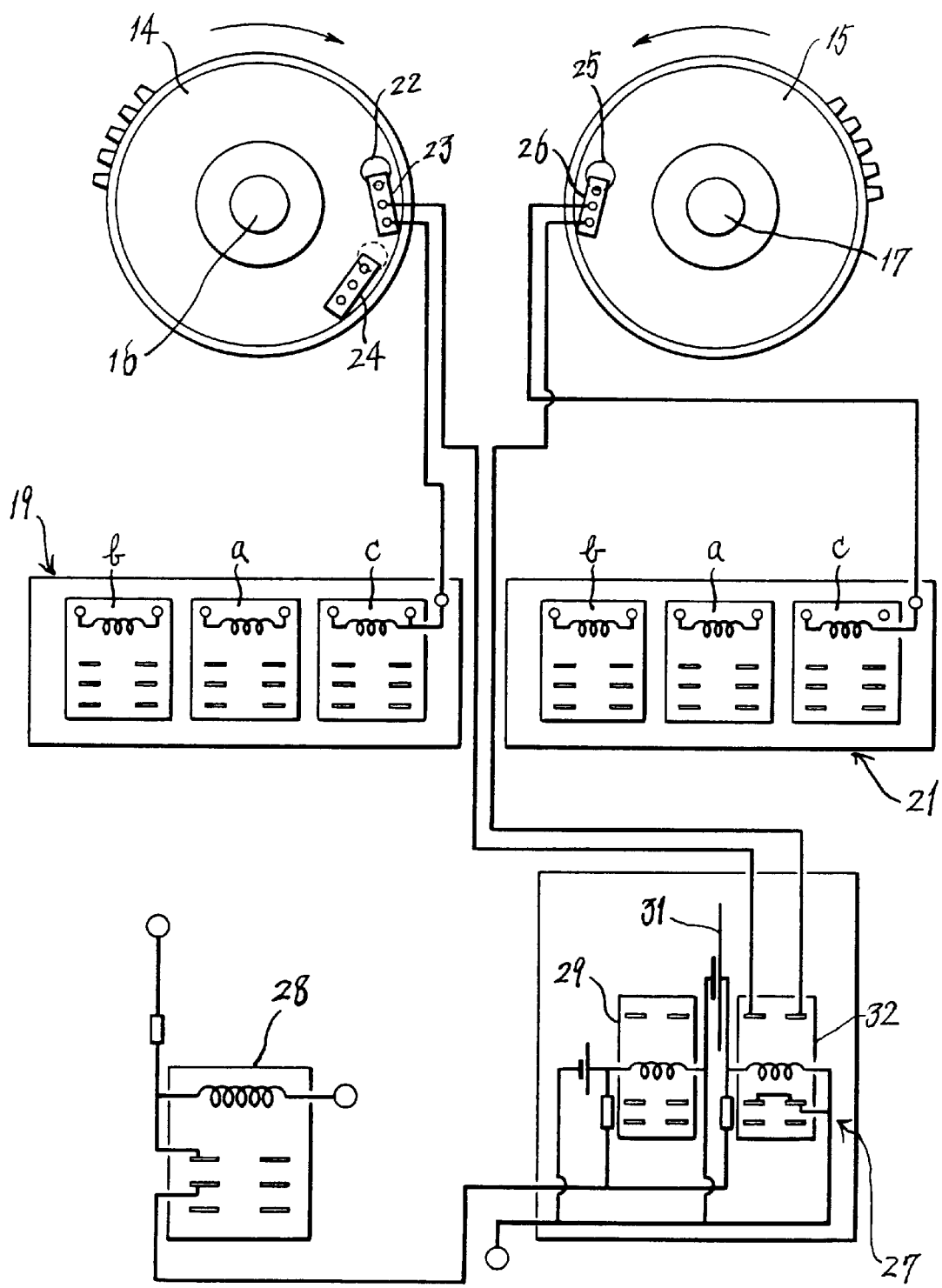
FIG. 5 is a circuit diagram of a brake mechanism of an intermittent driving apparatus for a rotary window cleaner in accordance with the present invention.

The electronic control circuit has a brake circuit 27 shown in FIG. 5. The brake circuit 27 is connected to the signal generating circuit 30 via a charging relay 28, and is connected to the time relay (c) of the first wiring board 19 and the time relay (c) of the second wiring board 21 via the brake sensor 23 of the motor gear 14 and the brake sensor 26 of the motor gear 15. It also has a first relay 29, a capacitor 31, and a second relay 32, which are connected in parallel to each other. The first relay 29 is connected to the signal generating circuit 30 through the charging relay 28. The second relay 32 is connected by the two parallel points to the brake sensor 23 of the first motor, which is connected to the time relay (c) of the first wiring board 19 and the brake sensor 26 of the second motor, which is connected to the time relay (c) of the second wiring board 21. The capacitor 31 is disposed between the first relay 29 and the second relay 32.

Figure 6:
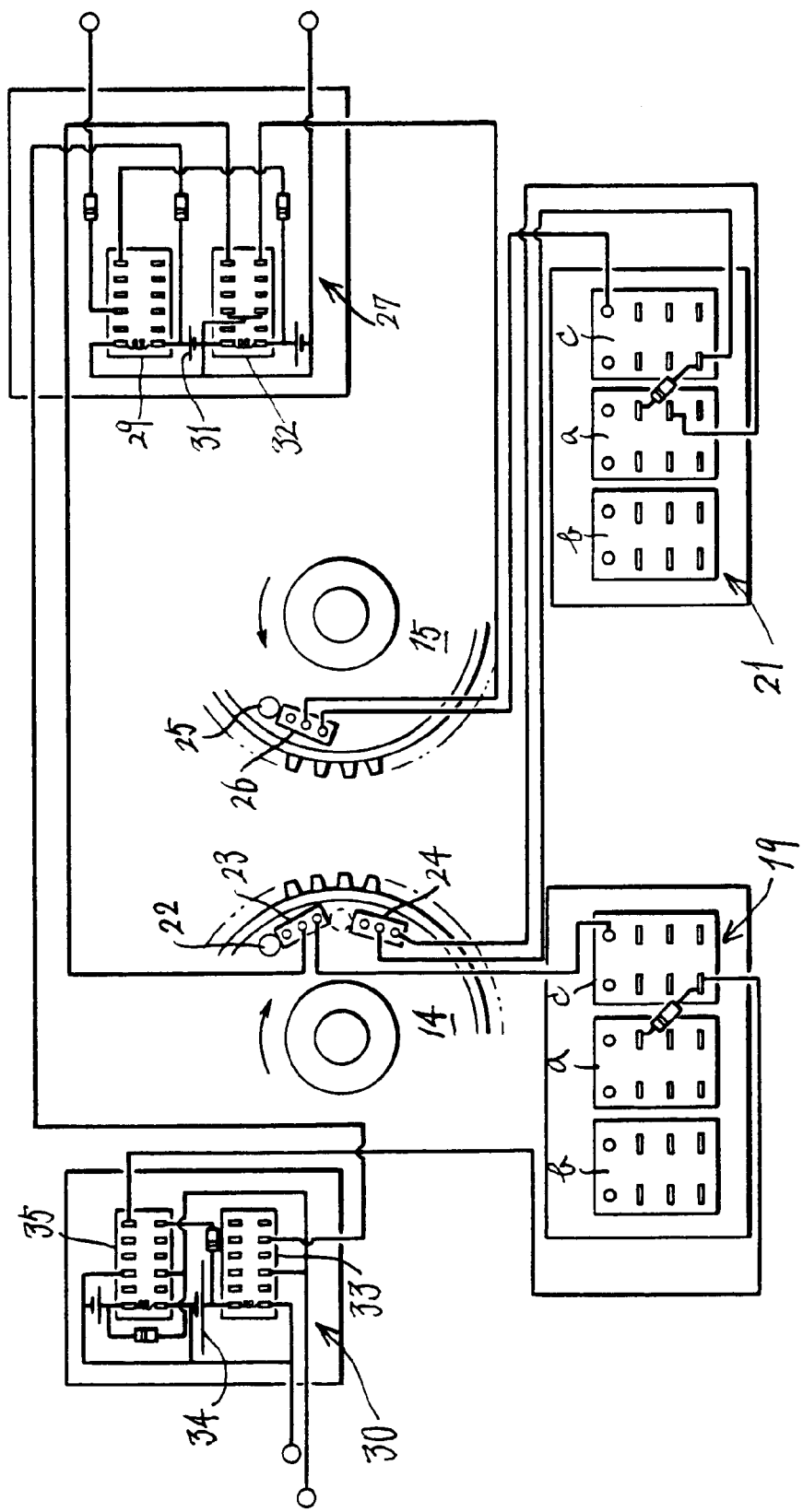
FIG. 6 is a circuit diagram of a signal generating circuit of an intermittent driving apparatus for a rotary window cleaner in accordance with the present invention.

As shown in FIG. 6, the signal generating circuit 30 of the electronic control circuit is connected to the first wiring board 19, which is connected to the brush board 18 of the first motor 8, and the brake circuit 27, which is connected to the first wiring board 19 and the second wiring board 21 through the brake sensor 23, 26 of the motor gear 14, 15. Also, it is connected to a power source via an operation switch, and has a first relay 33, a capacitor 34, and a second relay 35, which are connected in parallel to each other. The first relay 33 of the signal generating circuit 30 is connected to the first relay 29 of the brake circuit 27, the second relay 35 is connected to the normal rotation relay (a) of the first wiring board 19, which is connected to the brush board 18 of the first motor 8, and the capacitor 34 is disposed between the first relay 33 and the second relay 35.

When a signal for rotating the first motor 8 is transmitted by the operation switch, the first relay 33 of the signal generating circuit 30 is turned on, whereby the capacitor 34 is charged. When the first relay 33 and the second relay 35 are turned on at the same time, the capacitor 34 is turned on, and the signal generating circuit 30 is turned on. By the turning on of the signal generating circuit 30, the first relay 33 sends a brake signal to the brake circuit 27, and the second relay 35 sends a start signal to the normal rotation relay (a) of the first wiring board 19 connected to the brush board 18 of the first motor 8, to rotate the first motor 8. The capacitor 34 is used to perform an intermittent operation of the first motor 8 at intervals of about 5 seconds. The capacitor 34 can regulate the time interval of about 5 seconds by the volume.

The brake circuit 27, the brake sensors 23 and 26, and the time relays (c) and the reverse rotation relays (b) of the first wiring board 19 and the second wiring board 21 constitute a brake mechanism. When a brake signal is sent to the brake circuit 27 simultaneously with a start signal for rotating the first motor 8, the first relay 29 of the brake circuit 27 is turned on, by which the capacitor 31 is charged. When the first relay 29 and the second relay 32 are turned on at the same time, the capacitor 31 is turned on, and the brake circuit 27 is turned on. By the turning on of the second relay 32, the electric power is supplied to the brake sensor 23, 26 of the motor gear 14, 15 from two parallel points of the second relay 32, and thus the brake circuit 27 and the brake sensor 23, 26 wait in an energized state. When the operation cam 22, 25 is engaged with the brake sensor 23, 26 by the rotation of the motor gear 14, 15, the brake circuit 27 and the time relays (c) of the first wiring board 19 and the second wiring board 21 are energized. The normal rotation relay (a) is turned off, and the reverse rotation relay (b) is turned on, by which the motor and the motor gear are stopped, and the wiper 2, 3 is stopped at the start position. The capacitor 31 is provided so that the brake circuit 27 has an electric current corresponding to the time for which the wiper 2, 3 rotates more than one turn on the front window 1. The capacitor 31 causes an electric current to flow for about 1.5 seconds, and the wiper 2, 3 can always be stopped at the start position even if the rotation of the wiper 2, 3 is stopped at any position by switching the operation switch.

The following is a description of the operation of the intermittent driving apparatus for a rotary window cleaner. When the drive of the rotary window cleaner is switched to the intermittent driving position by the operation switch disposed close to a steering wheel of a vehicle, the signal generating circuit 30 of the electronic control circuit sends a signal having intervals of about 5 seconds to the brush board 18 through the normal rotation relay (a) of the first wiring board 19. Thereby, the first motor 8 is rotated, and a brake signal from the signal generating circuit 30 is sent to the brake circuit 27. The capacitor 31 is charged, and the brake circuit 27 and the brake sensor 23, 26 wait in an energized state. When the first motor 8 is rotated, the motor gear 14 meshing with the driving shaft 10 thereof rotates in the arrow-marked direction, by which the wiper 2 is rotated around the rotating shaft 4 through the transmitting mechanism in the support cylinder 6.

When the operation cam 22 attached to the motor gear 14 is engaged with the second motor start sensor 24 at a predetermined time after the first wiper 2 is rotated, a second motor start signal is sent to the brush board 20 through the normal rotation relay (a) of the second wiring board 21. When the second motor 9 is rotated, the motor gear 15 meshing with the driving shaft 11 thereof rotates in the arrow-marked direction opposite to the rotating direction of the motor gear 14, by which the second wiper 3 is rotated in the direction opposite to the first wiper 2 around the rotating shaft 5 through the transmitting mechanism in the support cylinder 7.

When the first wiper 2 has rotated one turn and the motor gear 14 has come to the start position, the operation cam 22 is engaged with the brake sensor 23. The brake sensor 23 electrically connected to the brake circuit 27, which has already been turned on, sends a brake signal to the time relay (c) of the first wiring board 19, so that the time relay (c) turns off the normal rotation relay (a) of the first wiring board 19, and turns on the reverse rotation relay (b). Thereby, the first motor 8 is stopped, and the motor gear 14 and the first wiper 2 are stopped at the start position. Subsequently, when the second wiper 3 has rotated one turn and the motor gear 15 has come to the start position, the operation cam 25 is engaged with the brake sensor 26. The brake sensor 26 electrically connected to the brake circuit 27, which has already been turned on, sends a brake signal to the time relay (c) of the second wiring board 21, so that the time relay (c) turns off the normal rotation relay (a), and turns on the reverse rotation relay (b). Thereby, the second motor 9 is stopped, and the motor gear 14 and the second wiper 3 are sopped at the start position. After a predetermined time, that is, after 5 seconds the next signal is sent from the signal generating circuit 30, by which the above operation is repeated at time set intervals. Subsequently, the signal generating circuit 30 performs repeated operations of first signal, second signal, and so on.

According to the intermittent driving apparatus in accordance with the present invention, at the time of rainfall of a very small amount or a small amount, it is possible to perform easily an intermittent operation even on the rotary window cleaner like the reciprocating window cleaner in such manner that after one wiper is rotated, the other wiper is rotated, and the two wipers do rotate one turn at the start position, and stopped at the start position for a predetermined time every one rotation. Also, the hindrance of the field of view on the front window can be reduced to the utmost on the rotary window cleaner. Further, in the intermittent operation of the two wipers, after one wiper is rotated, the other wiper is rotated in the opposite direction, by which the two wipers are rotated by forming lag angle between the two wipers. Therefore, the interference of the two wipers disposed close to each other can be avoided.

What is claimed is:

1. An intermittent driving apparatus for a rotary window cleaner comprising:

a first wiper which is connected to a rotating shaft of a first motor and is rotatably disposed on a front window;

a second wiper which is connected to a rotating shaft of a second motor and is rotatably disposed on the front window adjacently to the first wiper;

the first and second wipers each having a start position; and brush boards of the two motors connected to each other through an electronic control circuit so that the second motor is rotated at a predetermined time after the first motor is rotated, said electronic control circuit including a signal generating circuit for repeatedly sending signals to the brush board of the first motor at fixed time intervals, and a brake mechanism for stopping the two wipers at their respective start positions for a fixed time every one rotation of the respective rotating shafts.

2. The intermittent driving apparatus for a rotary window cleaner according to claim 1, wherein the signal generating circuit for repeatedly sending signals at predetermined time intervals is connected to the brush board of the first motor through a first wiring board and is connected to a brake circuit, a second motor start sensor is provided in a gear box of a motor gear of the first motor and is connected to the brush board of the second motor through a second wiring board to rotate the second motor at a predetermined time after the first motor is rotated, the brake circuit is connected through a brake sensor provided in the gear box of the first motor gear to the first wiring board and the brush board of the first motor, and the brake circuit is connected through a brake sensor provided in a gear box of the second motor gear to the second wiring board and the brush board of the second motor to stop the two wipers at the start position every one rotation of the respective rotating shafts, the motor gear of the first motor is provided with an operation cam engaging with the second motor start sensor and the brake sensor, and the motor gear of the second motor is provided with an operation cam engaging with the brake sensor.

3. The intermittent driving apparatus for a rotary window cleaner according to claim 2, wherein the first wiring board is connected to the brush board of the first motor and the second wiring board is connected to the brush board of the second motor.

4. The intermittent driving apparatus for a rotary window cleaner according to claim 1, wherein a brake mechanism for each of the two motors comprises a brake circuit having two relays and a capacitor disposed between the two relays, a brake sensor which is connected to the brake circuit and is provided in a gear box of each said motor gear, a time relay of the first wiring board and the second wiring board, which is connected to the brake sensor, and a reverse rotation relay of the first wiring board and the second wiring board, which is connected to the time relay and is connected to the brush boards of the two motors.

5. The intermittent driving apparatus for a rotary window cleaner according to claim 1, wherein the time interval at which signals are sent repeatedly to the brush board of the first motor through the first wiring board can be regulated.

* * * * *